(12) United States Patent
Kabitzke et al.

(10) Patent No.: US 10,135,384 B2
(45) Date of Patent: Nov. 20, 2018

(54) SYSTEMS AND METHODS FOR IMPLEMENTING MULTIPLE MOTOR CONTROL MODES IN A MOTOR DRIVE CONTROLLER

(71) Applicant: ROCKWELL AUTOMATION TECHNOLOGIES, INC., Mayfield Heights, OH (US)

(72) Inventors: Gary A. Kabitzke, Grafton, WI (US); Scott D. Braun, Menomonee Falls, WI (US); Ting Yan, Menomonee Falls, WI (US); Kenneth J. Fiore, Iron Ridge, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 134 days.

(21) Appl. No.: 15/043,926

(22) Filed: Feb. 15, 2016

(65) Prior Publication Data
US 2017/0237385 A1    Aug. 17, 2017

(51) Int. Cl.
*H02H 9/00*      (2006.01)
*H02P 31/00*     (2006.01)
*H02P 3/06*      (2006.01)
*G05B 19/19*     (2006.01)

(52) U.S. Cl.
CPC .............. *H02P 31/00* (2013.01); *G05B 19/19* (2013.01); *H02P 3/06* (2013.01)

(58) Field of Classification Search
CPC .................. H02H 9/00; H02H 9/004
See application file for complete search history.

(56) References Cited

U.S. PATENT DOCUMENTS

| 8,248,009 B2 | 8/2012 | Campbell et al. | |
|---|---|---|---|
| 8,593,090 B2 | 11/2013 | Campbell et al. | |
| 2005/0113216 A1* | 5/2005 | Cheng | A63B 22/02 482/54 |
| 2006/0126256 A1* | 6/2006 | Forest | B60W 50/029 361/139 |
| 2008/0294771 A1* | 11/2008 | Hermes | G05B 23/0267 709/224 |
| 2013/0289779 A1* | 10/2013 | Leany | H02P 23/0027 700/282 |
| 2015/0094850 A1* | 4/2015 | Passot | B25J 9/163 700/245 |

* cited by examiner

*Primary Examiner* — Bickey Dhakal
(74) *Attorney, Agent, or Firm* — Fletcher Yoder, P.C.

(57) ABSTRACT

A system may include a motor drive that controls one or more operations of a motor. The motor drive may include a first processor that controls the operations of the motor according to a first control mode application. The system may include a second processor that controls the operations of the motor according to a first control mode profile that corresponds to the first control mode application, receives a request to operate the motor according to a second control mode application, and executes a set of computer-readable instructions upon receipt of the request. The set of computer-readable instructions may cause the second processor to load an executable file associated with the second control mode application onto the first processor and send a first command to the first processor to execute the executable file associated with the second control mode application.

8 Claims, 6 Drawing Sheets

SYSTEMS AND METHODS FOR IMPLEMENTING MULTIPLE MOTOR CONTROL MODES IN A MOTOR DRIVE CONTROLLER

BACKGROUND

The subject matter disclosed herein relates to controlling an operation of a motor. More specifically, the subject matter disclosed herein relates to controlling a motor drive using multiple motor control modes.

BRIEF DESCRIPTION

In a first embodiment, a system may include a motor drive that controls one or more operations of a motor. The motor drive may include a first processor that controls the operations of the motor according to a first control mode application. The system may include a second processor that controls the operations of the motor according to a first control mode profile that corresponds to the first control mode application, receives a request to operate the motor according to a second control mode application, and executes a set of computer-readable instructions upon receipt of the request. The set of computer-readable instructions may cause the second processor to load an executable file associated with the second control mode application onto the first processor and send a first command to the first processor to execute the executable file associated with the second control mode application.

In a second embodiment, a method may include receiving, via a processor, a request to operate a motor according to a control mode configured to control one or more operations of the motor and identifying, via the processor, an executable file associated with the control mode from a plurality of executable files associated with a plurality of control modes. Each control mode of the plurality of control modes may manage the one or more operations of the motor. The method may also include executing, via the processor, the request by retrieving the executable file associated with the control mode; and executing the executable file.

In a third embodiment, a non-transitory computer-readable medium may include computer-executable instructions when executed by a first processor cause the first processor to set up access to a memory for the first processor and a second processor after the first processor receives a request to operate a motor according to a control mode. The second processor controls one or more operations of the motor, and the control mode specifies the operations. The first processor may then establish one or more communication links to one or more components coupled to the first processor, such that the communication links provide a first set of data to the second processor. The first processor may also send a first command to the second processor to load an executable file associated with the control mode from the memory. The first processor may then send a second command to the second processor to execute the executable file.

DRAWINGS

These and other features, aspects, and advantages of the presently disclosed embodiments will become better understood when the following detailed description is read with reference to the accompanying drawings in which like characters represent like parts throughout the drawings, wherein.

DETAILED DESCRIPTION

The present disclosure relates generally to operating a motor using different control modes. Motor drive controllers use different types of logic to control the operation of a motor. For example, motor drive controllers or motor drive control systems used in variable-speed applications may use a Volts-per-Hertz control mode (V/Hz) to control the operation of a connected motor. To operate according to any control mode, a motor drive controller is pre-configured or designed at a development phase of the controller to implement a number of control modes via a single application to operate a respective motor. In this manner, adjusting or changing the control mode being executed by a motor drive controller may be inflexible and inefficient.

Embodiments presented herein are generally related to loading, unloading, and reloading of individual motor control mode applications for execution by a motor drive controller. As mentioned above, some motor drive controllers are pre-configured or designed such that a number of motor control modes are programmed into a single firmware application of the controller and is not accessible for modification or changes after being placed in service for controlling an operation of a motor drive and connected motor.

In certain embodiments, a motor system may include system control circuitry for interfacing with a motor drive system and other components that may assist in the operation of a motor drive, a motor, and the like. The system control circuitry may generate or access a control profile that may be associated with a particular control mode application to operate the motor drive. The control profile may be executable code that may be executed by a processor disposed on the system control circuitry and may facilitate the transfer of data or information between components communicatively coupled to the system control circuitry and to drive control circuitry (e.g., motor drive controller) used to operate the motor drive.

After being initialized, the control profile may communicate with the drive control circuitry and load a particular control mode application into the drive control circuitry. Like the control profile, the control mode application may also be executable code that operates on the processor of the drive control circuitry and controls the operation of the motor drive and thus the motor. To load the control mode application onto the drive control circuitry, the control profile may send a command to the existing control mode application to begin its shut down procedure and then load the specified control mode application into the drive control circuitry. In addition to loading the control mode application into the drive control circuitry, the control profile may also update other components (e.g., databases, exception handlers, input/output modules, etc.) communicatively coupled to the system control circuitry that may be affected by the newly loaded control mode application. As such, these other components may provide relevant information to the drive control circuitry operating the motor drive according to the specified control mode application.

By using the control profile to modify the operation of the drive control circuitry, the drive control circuitry is capable of operating the connected motor a variety of different ways, thereby increasing the flexibility of the motor drive and the tasks that may be undertaken by the motor drive. Moreover, since the control profile is used to interface or communicate between the drive control circuitry, the system control circuitry, and various components connected to the system control circuitry, the control profile may provide an efficient way for a user to modify the operation of a motor system without generating customized executable code for the drive control circuitry.

With the foregoing in mind, certain terms used herein may be characterized as follows. For example, as used herein, control mode application may refer to one of a number of executable programs that executes on a processor of the drive control circuitry and controls an operation of a motor. The control mode application may be loaded onto the processor of the drive control circuitry by a control mode profile, which is characterized below. The control mode applications may be stored in files and may be referred to as an executable file in this document.

The control mode profile may refer to firmware that executes on a second processor of the system control circuitry. The control mode profile loads a control mode application upon request, informs the first processor of the drive control circuitry to shut down or halt, informs the first processor of the drive control circuitry to start, moves data sets to and from the control mode application, subscribes and publishes data, provides a connection to other components of the system.

Figure 1:
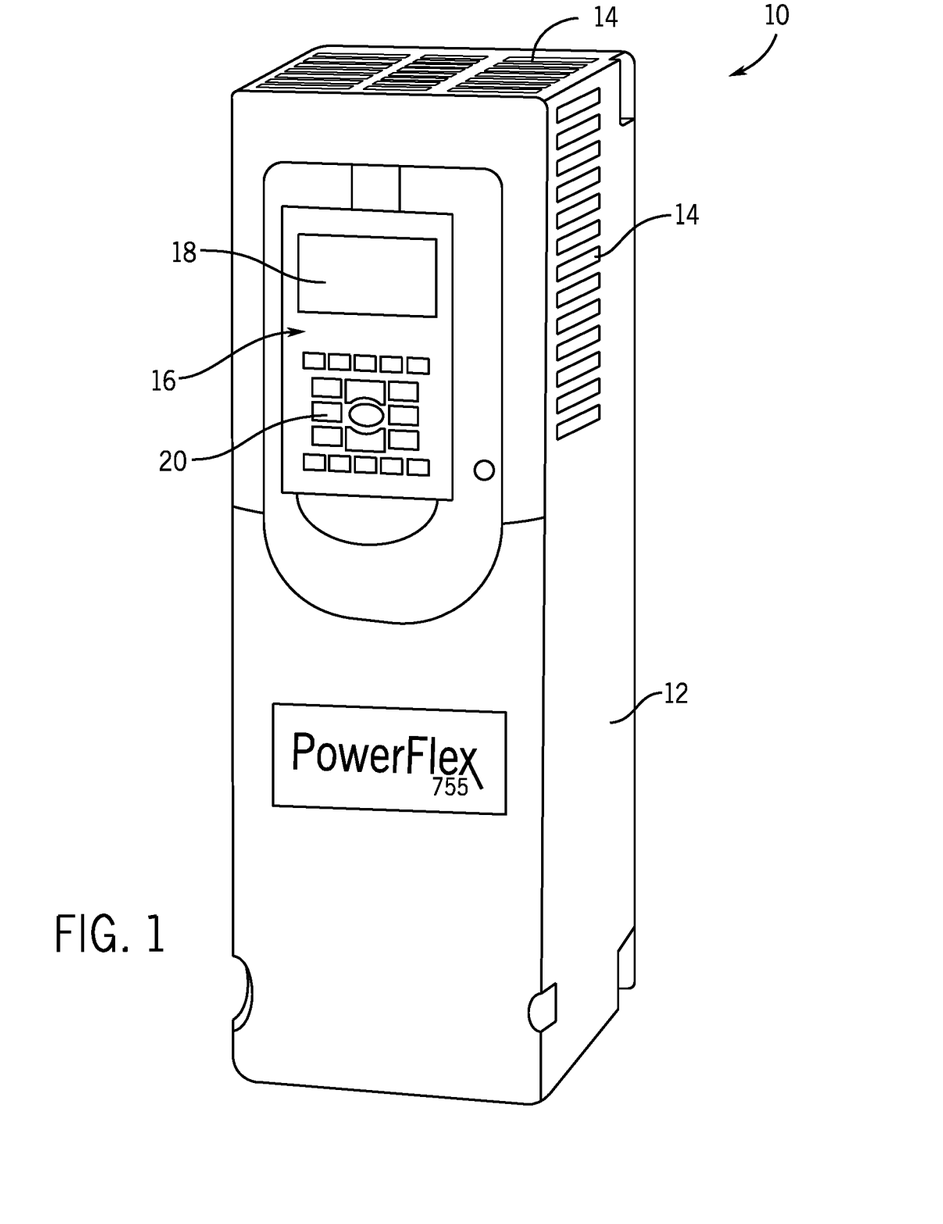
FIG. 1 is a perspective view of a motor drive, in accordance with an embodiment.

By way of introduction, FIG. 1 illustrates a perspective view of a motor drive 10. In one embodiment, the motor drive 10 may be a PowerFlex drive manufactured by Rockwell Automation of Milwaukee, Wis. The motor drive 10 may include a housing 12 having cooling vents 14 on one or more sides of the drive 10. To facilitate interacting with the motor drive 10, the motor drive 10 may include a human interface module (HIM) 16. The HIM 16 may include a display 18, such as a liquid crystal display (LCD) or other display and a keypad 20 allowing input by a user. Additionally, the HIM 16 may be removable and dockable in a receptacle in the housing 12.

As described further below, in one embodiment, the motor drive 10 is adapted to receive three-phase power from a power source, such as the electrical grid, and to convert fixed frequency input power from the power source to controlled frequency output power. As such, the motor drive 10 may manage application of electrical power to the loads, typically including various machines or motors. The motor drive 10 may also collect data from the loads, from various sensors associated with the load, from a machine system of which the load is part, and the like. Such data may be used in monitoring and control functions, and may include parameters such as current, voltage, speed, rotational velocity, temperatures, pressures, and so forth. The motor drive 10 may be associated with a variety of components or devices (not shown) used in the operation and control of the loads. Exemplary devices contained within the motor drive 10 include, for example, motor starters, overload relays, circuit breakers, and solid-state motor control devices, programmable logic controllers, and so forth. In some instances, the motor drive 10 may be used in conjunction with other motor drives, such that a plurality of motor drives may be used to control one or more processes or a plurality of motors.

Figure 2:
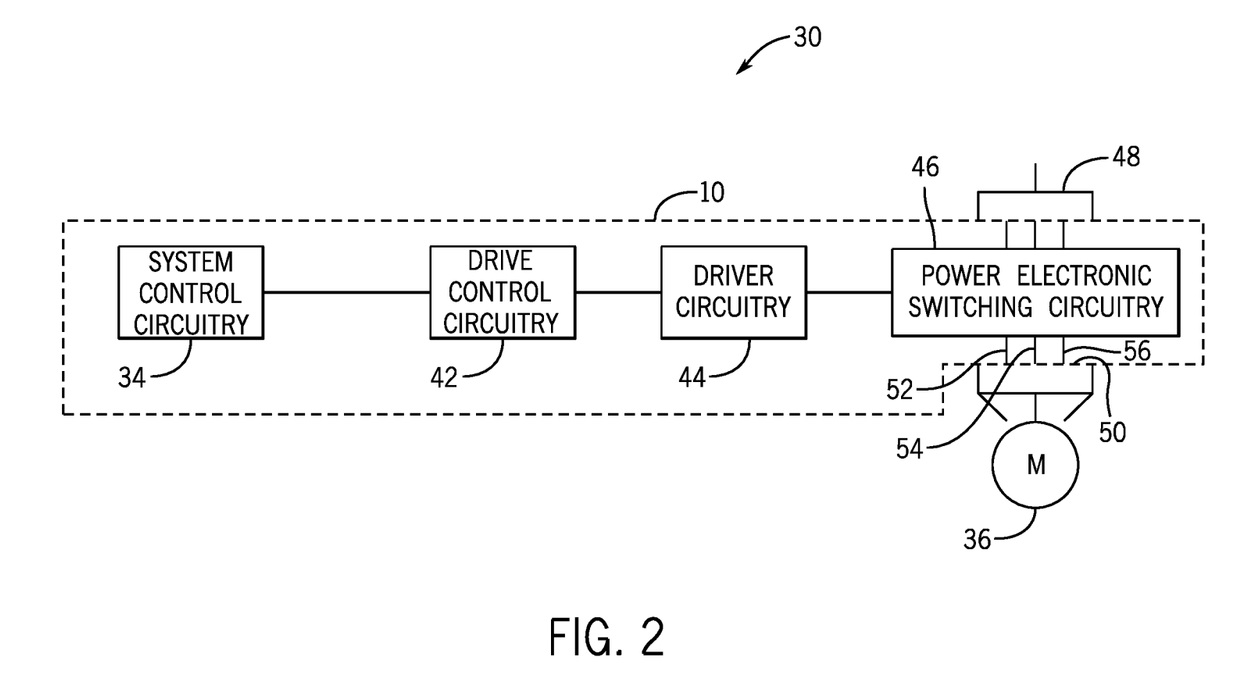
FIG. 2 is a block diagram of a motor drive system, in accordance with an embodiment.

FIG. 2 illustrates a block diagram of a motor drive system 30. For example, the motor drive system 30 may include the motor drive 10, system control circuitry 34, and a motor 36. The motor drive 10 may include drive control circuitry 42, driver circuitry 44, and power electronic switching circuitry 46. The power electronic switching circuitry 46 may receive three-phase power 48, and output three-phase power 50 to the motor 36. To facilitate control of the motor drive 10, the system control circuitry 34 may be connected to the motor drive 10. Remote control, monitoring functions, and coordinated operation of the motor drive 10 may be performed via a network connection. Moreover, such networks and network connections may be based on any known or subsequently developed standard, including standard industrial protocols, Ethernet protocols, Internet protocols, wireless protocols, and so forth.

The drive control circuitry 42 may control the operation of the driver circuitry 44, which may send signals to switches of the power electronic switching circuitry 46. These signals may cause the switches to rapidly close and open, resulting in a three-phase waveform output across the output terminals 52, 54, and 56. As mentioned above, the driver circuitry 44 is controlled by the driver control circuitry 42, which may operate autonomously, or which may respond to command inputs from the system control monitor 34 through a network. Similarly, operation of the driver circuitry 44 may be coordinated, via the system control circuitry 34, with that of other drives. Many different control schemes and functions may be implemented by the system control circuitry 34, and programs for such operation may be stored on a non-transitory computer-readable medium. Additional details with regard to how the system control circuitry 34 may modify or adjust the operation of the drive control circuitry 42 to modify the operation of the motor 36 will be described below.

Figure 3:
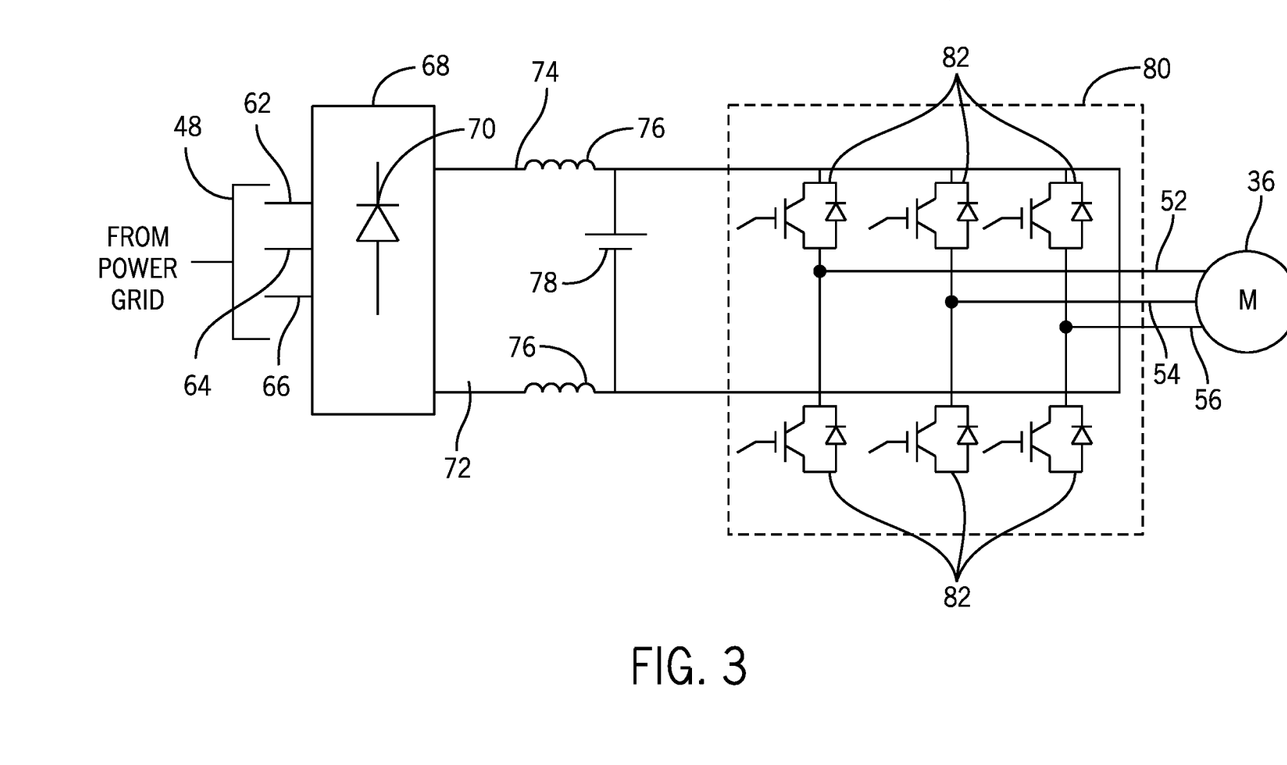
FIG. 3 is a schematic diagram of the power electronic switching circuitry of the motor drive system of FIG. 2, in accordance with an embodiment.

FIG. 3 is a schematic diagram of power electronic switching circuitry 60 of the motor drive system 30. As mentioned above, the power electronic switching circuitry 46 will typically receive as an input three-phase power 48, such as from the power grid. The three-phase power source is electrically coupled to a set of input terminals 62, 64, and 66 that provide three phase AC power of constant frequency to rectifier circuitry 68. The rectifier circuitry 68 includes components, such as diodes 70 that perform full wave rectification of the three-phase voltage waveform. After rectification, all phases of the incoming power are combined to provide DC power to a low side 72 and a high side 74 of a DC bus. Inductors 76 may be coupled to both the high and low sides of the DC bus and act as chokes for smoothing the rectified DC voltage waveform. One or more filter capacitors 78 may link the high side 74 and low side 72 of the DC bus and are also configured to smooth the rectified DC voltage waveform. Together, the inductors and capacitors serve to remove most of the ripple from the waveform, so that the DC bus carries a waveform closely approximating a true DC voltage. It should be noted that the three-phase implementation described herein is not intended to be limiting, and the invention may be employed on single-phase circuitry, as well as on circuitry designed for applications other than motor drives.

An inverter 80 or active-front end (AFE) converter is coupled to the DC bus and generates a three-phase output waveform at a desired frequency for driving a motor 36 connected to the output terminals 52, 54, and 56, or facility power grid, respectively. In the illustrated embodiment, within the inverter 80, for each phase, two insulated gate bipolar transistors (IGBT's) 82 are coupled in series, collector to emitter, between the high side 74 and low side 72 of the DC bus. Three of these transistor pairs are then coupled in parallel to the DC bus, for a total of six transistors 82. Each of the output terminals 52, 54, and 56 is coupled to one of the outputs between one of the pairs of transistors 82. The driver circuitry 44 signals the transistors 82 to rapidly close and open, resulting in a three phase waveform output across output terminals 52, 54, and 56. The driver circuitry 44 is controlled by the drive control circuitry 42. Although the above description of the driver circuitry 44 is described with transistors 82, it should be noted that the driver circuitry 44 may include any type of switching device, such as a metal-oxide-semiconductor field-effect transistor and the like.

Figure 4:
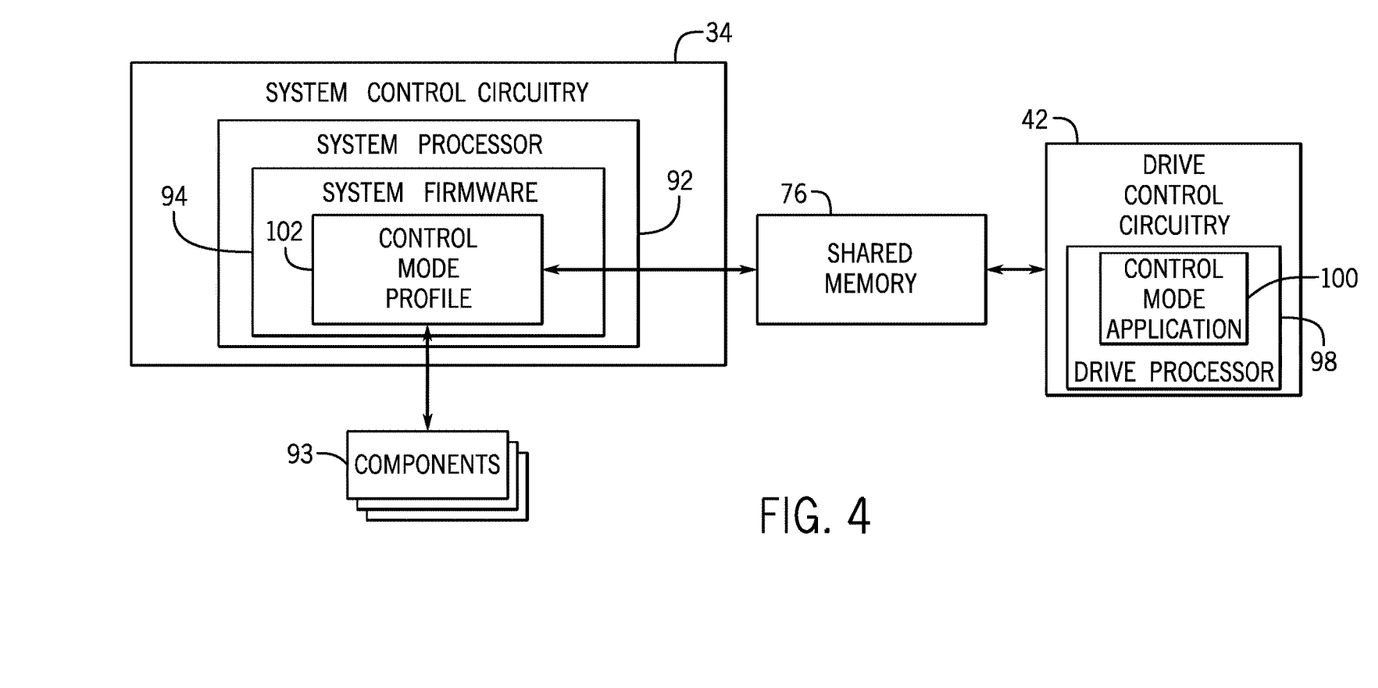
FIG. 4 is a block diagram of system control circuitry of the motor drive system of FIG. 2, in accordance with an embodiment.

With the foregoing in mind, FIG. 4 illustrates a block diagram of the system control circuitry 34 of the motor drive system 30. The system control circuitry 34 may adjust the operation of the motor drive 10 via the drive control circuitry. As shown in FIG. 4, the system control circuitry 34 may include a processor 92 that may execute system firmware 94, which may control the operations of various components 93 of the motor drive 10. For example, the system firmware 94 may communicate with a user interface of the motor drive 10, one or more databases related to the operations of the motor drive 10, an exception handler, one or more input/output modules used in the motor drive 10, various buttons disposed on the motor drive, various communication protocols (e.g., Ethernet, DeviceNet, etc.) employed by the motor drive 10, and the like. As such, the system firmware 94 may include various software modules such as Datastore, Dispatcher, Logic Parser, Fault/Alarm/Event Handler, etc. Moreover, the components 93 may refer to software applications used to operate the system control circuitry 34 and various devices connected to the system control circuitry 34. In general the Datastore is where all runtime configuration data is stored. The Datastore is in RAM memory and created from data stored in files on the file system. The Dispatcher is used by other modules to access the data in the Datastore. The Logic Parser is used to gather user input logic requests to create motor start and motor stop commands. The Fault/Alarm/Event Handler is used to gather drive system status, good or bad, from all functioning modules in the system and report them to the user.

In addition to the processor 92, the system control circuitry 34 may include a communication component, a memory, a storage, input/output (I/O) ports, a display, and the like. The communication component may be a wireless or wired communication component that may facilitate communication between the system processor 92, the drive processor 98, the components 93, and other communication-capable devices.

The system processor 92 may be any type of computer processor or microprocessor capable of executing computer-executable code. As such, the system processor 92 may also include multiple processors that may perform the operations described below. The memory and the storage may be any suitable articles of manufacture that can serve as media to store processor-executable code, data, or the like. These articles of manufacture may represent computer-readable media (i.e., any suitable form of memory or storage) that may store the processor-executable code used by the processor 92 to perform the presently disclosed techniques. The memory and the storage may also be used to store the data, analysis of the data, and the like. The memory and the storage may represent non-transitory computer-readable media (i.e., any suitable form of memory or storage) that may store the processor-executable code used by the processor 24 to perform various techniques described herein. It should be noted that non-transitory merely indicates that the media is tangible and not a signal.

The I/O ports may be interfaces that may couple to other peripheral components such as input devices (e.g., keyboard, mouse), sensors, input/output (I/O) modules, and the like. I/O modules may enable the system processor 92 to communicate or interact with other devices in the motor drive system 30.

The display may depict visualizations associated with software or executable code being processed by the system processor 92. In one embodiment, the display may be a touch display capable of receiving inputs from a user of the motor drive system 30. As such, the display may serve as a user interface to communicate with the components of the motor drive system 30. The display may be any suitable type of display, such as a liquid crystal display (LCD), plasma display, or an organic light emitting diode (OLED) display, for example. Additionally, in one embodiment, the display may be provided in conjunction with a touch-sensitive mechanism (e.g., a touch screen) that may function as part of a control interface for the system control circuitry 34. In some embodiments, the operator interface may be characterized as a human-machine interface, a human-interface machine, or the like. It should be noted that the components discussed above as being part of the system control circuitry 34 may also be included as part of the drive control circuitry 42.

Referring again to FIG. 4, the system control circuitry 34 may have access to shared memory 96, which may be a hardware interface between the system firmware 94 and the drive control circuitry 42. In one embodiment the shared memory 96 may be part of a Random Access Memory (RAM) of the drive control circuitry 42, but it should be understood that the shared memory 96 may be located in any memory of the drive control circuitry 42 or the system control circuitry 34.

Regardless of where the shared memory 96 is, the drive control circuitry 42 may use the shared memory 96 to control the operation of the motor 36 via a drive processor 98. In one embodiment, the drive processor 98 may execute control application 100, which may be software used to control the operation of the driver circuitry 44 and, in turn, the operation of the power electronic switching circuitry 46 and the motor 36. The control mode application 100 may specify how the motor 36 may operate. For example, the control mode application 100 may control the motor 36 according to closed loop speed, closed loop torque control, closed loop voltage control, or open loop speed control. The control mode application may use different modulation techniques such as, space vector pulse-width modulation (SVPWM), direct torque control (DTC), and the like. The control mode application 100 may also be separated according to voltage class (e.g., low voltage, medium voltage, high voltage according to ANSI standards). The control mode application and the corresponding control mode profile 102 may also include instructions for operating load devices according to various modes such as induction motor modes, surface permanent magnet (SPM) motor modes, synchronous reluctance motor modes, internal permanent magnet (IPM) motor modes, adjustable voltage modes, active front end (AFE) modes, fundamental front end (FFE) modes, and the like.

To operate the motor 36, the control mode application 100 may receive information from the components 93 of the motor drive 10 that may be accessible to the system control circuitry 34. As such, the control mode application 100 may use another software application (e.g., control mode profile 102) to interface or access these components 93 via the system control circuitry 34. In one embodiment, the control mode profile 102 may provide the control mode application 100 an interface between the system control circuitry 34 and the various components 93 communicatively coupled to the system control circuitry 34. For instance, the control mode profile 102 may provide data movement, fault processing, event processing, and parameter processing for the control mode application 100.

The control mode profile 102 may thus generally communicate with the components 93 and adjust certain parameters of the components 93, such that they may provide relevant data to the control mode application 100 being executed by the drive processor 98. Additionally, the control mode profile 102 may specify parameter settings, units of measurement, parameter names, and the like for various objects used by the control mode application 100. As such, the control mode profile 102 may be used to preconfigure certain settings of the components 93 of the motor drive 10 to enable the control mode application 100 to efficiently operate the motor 36.

In certain embodiments, the control mode profile 102 may be created based on user configuration via a user interface or the like. Alternatively, the control mode profile 102 may be created at power-up or soft reset of the system processor 92. The control mode profile 102 has one matching control mode application 100, which may be used together to operate the drive control circuitry 42.

Generally, the system processor 92 may execute the control mode profile 102 when attempting to control the operation of the motor 36. As such, the control mode profile 102 has a matching control mode application 100 via the shared memory 96 or some other memory device. In addition to having a matching control mode application 100, the control mode profile 102 may perform certain operations to prepare the motor drive system 30 to operate the motor 36 according to a selected control mode application 100. For example, the control mode profile 102 may request certain data subscription services from the components 93 or other devices that the control mode application 100 may use to efficiently control the operation of the motor 36. For example, the control mode profile 102 may request data regarding various components of the motor drive system 30 to be provided to the control mode application 100 via the control profile object 102. In general, if the control mode profile or control mode application needs data from other components of the system, it asks an intermediate object, the publisher/subscriber object, for that component's data, via what is called a subscription service.

In the same manner, the control mode profile 102 may also provide publication services to share data provided by the control mode application 100 to the components 93 or other devices in the motor drive system 30. Additionally, the control mode profile 102 may provide exception handling services, command handling services, reference handling services, and status handling services between the control mode application 100 and the various components that may be communicatively coupled to the system control circuitry 34. In general for publishing, if the control mode profile or control mode application has data that other components need, the control mode profile will publish said data to an intermediate object, the publisher/subscriber object. Once published, any other component needing control mode application data can subscribe to said data via the subscriber object as indicated above. In general the control mode profile exception handling service passes indications of fault states from the control mode application to the system fault object to inform the user of the state of the control mode application, good or bad. Command, Status and Reference handling service is a combined service. The control mode profile receives commands e.g. motor start, motor stop and speed (reference) from another component in the system and passes these commands to the control mode application, which starts the motor and commands it to a set speed or set torque or commands it to stop. Status data comes from the control mode application, e.g., accelerating, de-accelerating or motor at speed. This data is read by the control mode profile and sent to another component in the system. These handling services do not use the publisher/subscriber services.

Figure 5:
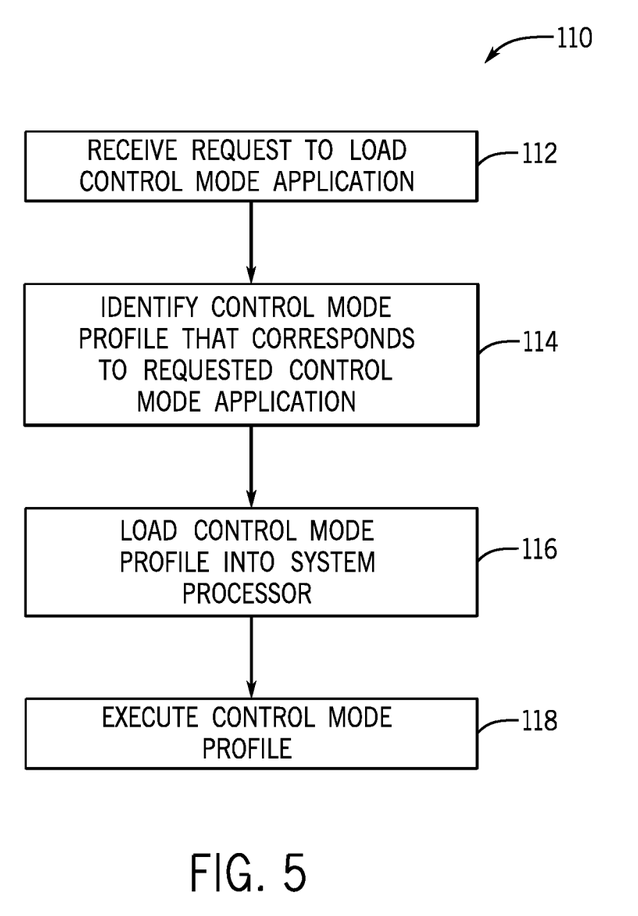
FIG. 5 is a flow chart of a method to initialize a control profile object for operating the motor drive system according to a particular control mode application, in accordance with an embodiment.

With the foregoing in mind, FIG. 5 illustrates a flow chart of a method 110 for initializing the control mode profile 102 for operating the motor drive 10 according to a particular control mode application 100. Although the following description of the method 110 is described as being performed by the system processor 92, it should be noted that any processor that may be part of a component in the motor drive system 30 may perform the operations specified here.

As mentioned above, the control mode profile 102 may enable the system processor 92 to load and unload various control mode applications 100 into the drive processor 98. That is, the control mode profile 102 makes adjustments to various components 93, such as other software applications, and communicates commands to the drive processor 98 to shut down, load the control mode application 100, unload the control mode application 100, start, halt, and the like.

Referring now to FIG. 5, at block 112, the system processor 92 may receive a request to load a control mode application 100 into the drive processor 98. In one embodiment, the request may specify a particular control mode application 100 that corresponds to a desired operation of the motor 36. As detailed above, the control mode application 100 may specify to the processor 98 how to operate the motor 36 (e.g., according to particular control algorithm). As such, the control mode application 100 may determine firing angles and switch commands to operate the switches of the power electronic switching circuitry 46 according to a corresponding motor control algorithm. Additionally, the control mode application 100 may acquire various measurements (e.g., temperature) from various sensors associated with the motor drive system 30, start and stop the operation of the motor 36, measurement of an amount of time that the motor 36 operates, and the like.

After receiving the request to load the control mode application 100, the system processor 92 may, at block 114, identify a control mode profile 102 that corresponds to the requested control mode application 100. In one embodiment, a number of control mode profiles 102 may be stored in a file system accessible to the system processor 92, or some other storage device accessible to the system processor 92. In certain embodiments, if the system processor 92 is currently executing an existing control mode profile 102, the system processor 92 may stop the execution of the existing control mode profile 102. In the same manner, if the system processor receives an indication that the drive processor 42 is currently executing a control mode application 100, the system processor 92 may send a signal or command to the drive processor 42 to cause the drive processor 42 to stop executing the existing control mode application 100.

At block 116, the system processor 92 may load the identified control mode profile 102 from the file system into the system firmware 94. After loading the control mode profile 102, the system processor 92, at block 118, may execute the control mode profile 102.

Figure 6:
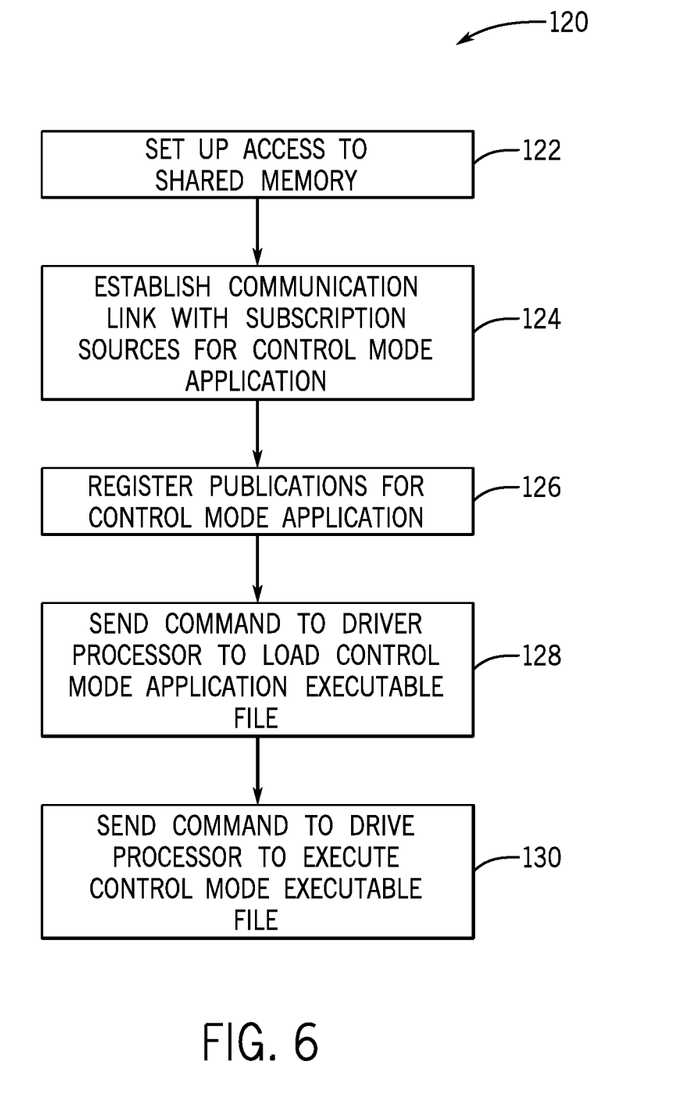
FIG. 6 is a flow chart of a method for executing the control profile and loading the particular control mode application into drive control circuitry, in accordance with an embodiment.

FIG. 6 illustrates a flow chart of a method 120 to initialize the control mode profile 102 for operating the motor drive system 30 according to a particular control mode application 100. As mentioned above, although the following description of the method 120 is described as being performed by the system processor 92, it should be noted that any processor that may be part of a component in the motor drive system 30 may perform the operations specified here. In certain embodiments, the system processor 92 performs the operations described herein while executing the control mode profile 102 or after performing the method 110 described above. As such, the control mode profile 102 may provide computer-readable instructions that cause the system processor 92 to perform the following operations.

Referring now to FIG. 6, at block 122, the system processor 92 may initialize or set up access to the shared memory 96. That is, the system processor 92 may configure the shared memory 96 to be accessed by the system processor 92 and the drive processor 98. As mentioned above, if the drive processor 98 is already executing another control mode application 100, the control mode profile 102 may direct the system processor 92 to shut down the drive processor 98 before loading the selected control mode application 100. As such, before the selected control mode application 100 is loaded into the drive processor 98, the system processor 92 may send a command to the drive processor 98 to shut down. Upon receiving this command, the drive processor 98 may begin its shut down process and unload or delete the control mode application 100 previously being executed by the processor 98. After the control mode application 100 is shut down, a corresponding control mode profile 102 interfacing with the previously running control mode application 100 will shut itself down. As such, the system processor 92 may be ready to execute the new control mode profile 102, and thus, load the new control mode application 100 into the drive processor memory 98.

Referring back to FIG. 6, at block 124, the system processor 92 may establish a communication link with subscription sources for the control mode application 100. As discussed above, the control mode profile 102 may specify certain components 93 that may provide data for the control mode application 100 to receive. In the same manner, at block 126, the system processor 92 may register various publications for the control mode application 100. Again, the control mode profile 102 may specify the publications that the control mode application 100 will publish and the components 93 that may receive the publications from the control mode application 100.

At block 128, the system processor 92 may load an executable file that corresponds to the control mode application specified in the method 110 of FIG. 5 into the drive processor 98. In one embodiment, the executable file may be read by the system processor 92 according to instructions provided by the control mode profile 102. After the executable file is read, the system processor 92 may store the executable file in the control processor memory 96. After the executable file is loaded into the drive processor 98, at block 130, the system processor 92 may send a command to the drive processor 98 to execute the executable file that corresponds to the control mode application 100.

Although the foregoing descriptions of the methods 110 and 120 are described as being performed by the system processor 92, it should be noted that any processor that may be part of a component in the motor drive system 30 may perform the operations specified here. Moreover, in some embodiments, the methods 110 and 120 may be performed by one processor—the system processor 92 or the drive processor 98. That is, the functions of both processors may be combined, such that all of the operations detailed in the methods 110 and 130 may be performed by the single processor.

Technical effects of the embodiments described herein include modifying the operation of the drive control circuitry 42, such that the drive control circuitry 42 may operate the motor 36 a variety of different ways, thereby increasing the flexibility of the motor 36 and the tasks that may be undertaken by the motor. Moreover, since the control mode profile object 102 is used to interface or communicate between the drive processor 98, the system processor 92, and various components connected to the system control circuitry 34, the control mode profile 102 may provide an efficient way for a user to modify the operation of a motor system without generating customized executable code for the drive processor 98.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving, via a first processor, a request to operate a motor according to a control mode profile configured to control one or more operations of the motor, wherein the control mode profile comprises one or more publication services configured to cause the first processor to receive data from a second processor of a motor controller for the motor, wherein the data is associated with a control mode application configured to operate according to the control mode profile, wherein the motor controller is configured to control the one or more operations of the motor;
identifying, via the first processor, an executable file associated with the control mode profile from a plurality of executable files associated with a plurality of control mode profiles, wherein each control mode profile of the plurality of control mode profiles is configured to manage the one or more operations of the motor;
executing, via the first processor, the request by:
retrieving the executable file associated with the control mode profile; and
executing the executable file by:
sending the control mode profile to the second processor, wherein the second processor is configured to acquire the data via the control mode application operating according to the control mode profile; and
receiving the data from the second processor; and
providing the data to one or more software applications being executed by the first processor.

2. The method of claim 1, wherein identifying the executable file comprises cross-referencing the control mode with the plurality of executable files.

3. The method of claim 1, wherein executing the executable file comprises establishing one or more subscription services configured to cause the second processor to provide the data to the first processor when the second processor is executing the control mode application.

4. The method of claim 1, wherein the one or more software applications comprise an interface of a drive configured to provide power to the motor, one or more databases related to the one or more operations of the motor, an exception handler, one or more input/output modules used in the drive, various buttons disposed on the drive, one or more communication protocols employed by the drive, or any combination thereof.

5. A non-transitory computer-readable medium comprising computer-executable instructions when executed by a first processor cause the first processor to:
set up access to a memory for the first processor and a second processor after the first processor receives a request to operate a motor according to a control mode profile, wherein the second processor is associated with a motor controller for the motor, wherein the motor controller is configured to control one or more operations of the motor, and wherein the control mode profile is configured to specify the operations and cause the second processor to execute a control mode application according to the control mode profile by establishing one or more subscription services for the first processor;
establish one or more communication links to one or more software components being executed by the first processor, wherein the communication links are configured to facilitate the one or more subscription services by sending a first set of data associated with an operation of the control mode application by the second processor to the one or more software components via the first processor;
send a first command to the second processor to load an executable file associated with the control mode profile from the memory; and
send a second command to the second processor to execute the executable file thereby causing the second processor to:
control the one or more operations of the motor based on the control mode application; and
send the first set of data to the first processor.

6. The non-transitory computer-readable medium of claim 5, wherein the computer-executable instructions cause the first processor to register one or more publication services configured to cause the second processor to provide the data to the one or more software components via the first processor.

7. The non-transitory computer-readable medium of claim 6, wherein the software components comprise exception handling services, command handling services, reference handling services, and status handling services.

8. The non-transitory computer-readable medium of claim 5, wherein the computer-executable instructions when executed by the first processor cause the first processor to send a third command to the second processor to shut down prior to sending the first command to the second processor to load the executable file.

* * * * *